June 6, 1972   LE GRAND K. HOLBROOK   3,667,781
CONNECTOR MEANS FOR FLEXIBLE CONDUIT
Filed June 26, 1970

*INVENTOR.*
Legrand K. Holbrook
BY M. Ralph Shaffer
*His Attorney*

United States Patent Office 3,667,781
Patented June 6, 1972

3,667,781
CONNECTOR MEANS FOR FLEXIBLE CONDUIT
Le Grand K. Holbrook, Salt Lake City, Utah, assignor to Medical Development Corporation, Salt Lake City, Utah
Filed June 26, 1970, Ser. No. 50,195
Int. Cl. F16l *11/12*
U.S. Cl. 285—45
2 Claims

ABSTRACT OF THE DISCLOSURE

A connector means for flexible conduit, usable particularly in hospital and especially surgical contexts where tubing is to be cut to length on site. The connector means includes a connector and tube combination wherein the tube is slideable relative to the connector, yet wherein the juncture is protected against contamination. Wedging or constriction means are supplied so as to prevent inadvertent pull-out of the tube relative to the connector. Multiple connector and tube combinations may be operatively associated together in the manner below described, and the connector may be used for completing connection to a number of different, desired objects.

---

The present invention relates to connector means incorporating flexible conduit such as that found in hospitals and, more particularly, to a new and improved connector means which will accommodate attachment to a number of different types of objects such as vacuum-operated liquid fill bottles, additional tubings supplied with end connections, vacuum pumps, and so forth.

In the past there has been considerable difficulty incurred in connection with tubular conduit equipment which will lend itself readily to make-up in the hospital room concerned. It would be ideal, of course, to discover or improvise equipment that can be readily cut to length in the hospital and supplied with an appropriate end fitting, for connection to a desired source such as other tubular conduit, vacuum pumps, vacuum operated fill bottles, and so forth.

It is an object of the present invention to provide new and improved connector means wherein flexible tubing may be cut to any desired length and promptly fitted with an end fitting or connector which is versatile and designed for connection to a number of objects.

A further object of the invention is to provide improved connector means which can be adapted and/or used to connect to any one of a number of different sources of connection, be they vacuum pumps, vacuum-filled fluid collection bottles, other connector tubing, and so forth.

A further object of the invention is to provide a tubular conduit and end fitting combination which can be easily assembled and yet retain optimal sealing quality, so that external contamination sources will not affect or contaminate the interior region of the subject connection means.

An additional object is to provide connector means including tubular conduit which can be easily assembled, and this without chancing disconnection of the tubular conduit from the connector in the combination.

A further object is to provide a versatile connector means whereby plural ones of the same may be used to connect adjacent lengths of tubing.

In accordance with the present invention a preferably transparent connector member is supplied with a protective sleeve designed to frictionally and slideably receive tubular conduit of conventional cylindrical form and cut to any desired length. Once the tubular conduit is thrust through the connector to be encompassed by the frictionally engaging protective sleeve thereof, then the operating end of the tubular conduit may be supplied with a rigid stiffener tube or interior cylinder, whereby slide-out of the tubular conduit from the connector is precluded. Additionally, the end of the conduit may be advanced forwardly and out of the connector so as to accommodate multiple connector arrangements. The connector and tubular conduit combination is designed for connection to a number of devices such as vacuum pumps, vacuum operated liquid filled objects, additional connectors and lines, and so forth.

The features of the present invention which are believed to be novel are set forth with particularity in the appended claims. The present invention, both as to its organization and manner of operation, together with further objects and advantages thereof, may best be understood by reference to the following description, taken in connection with the accompanying drawings in which:

Figure 1:
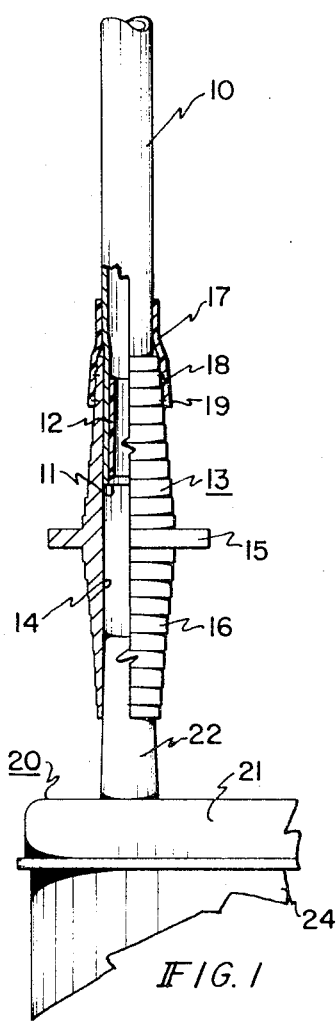
FIG. 1 is a fragmentary side elevation, partially in section, of a representative connector and tubular conduit combination utilized in practicing the invention.
Figure 5A:
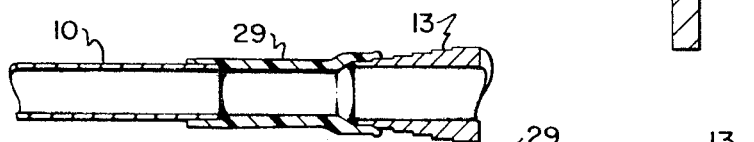
FIG. 5A is an elevation, principally in section, of the connector of the present invention being coupled to an elastomeric end fitting of a contiguous connector.
Figure 5B:
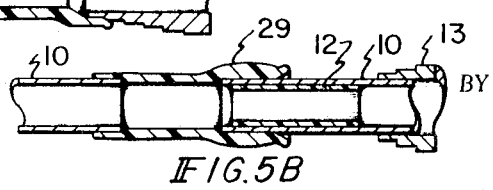
FIG. 5B is a view similar to FIG. 5A but illustrates an optional or alternate coupling arrangement as between external tubing having a conventional, elastomeric end fitting and the tubing encompassed by the connector of the present invention.

In FIG. 1 conduit 10 is a tubular flexible plastic tube such as a conventional polyethylene surgical tube, cut to any desired length. The extremity of conduit 10 is illustrated at numeral 11. Disposed within the end of conduit 10 is a rigid polyethylene plastic tube 12. Connector 13 is made of a deformable grade of polyethylene plastic and includes a central aperture 14 proceeding along the longitudinal axis thereof. Connector 13 may be provided with a medial flange 15 designed to accommodate thumb and finger actuation. A stepped exterior surface 16 accommodates gripping as well as elastomeric end fitting placement as shown in the manner of FIGS. 5A and 5B. A dust jacket in the form of a protective sleeve 17 may be made of an elastomeric material such as rubber, or a suitable polyethylene plastic which is heat-welded or heat-seamed as at 18 and 19 in a circumferential manner, so that the tubular conduit 10 may be essentially sealed from exterior contamination. It is noted, however, that the tubular conduit 10 is frictionally slideable within the protective sleeve 17.

A vacuum bottle 20 is designed for body fluid collection, by way of example, and includes lid 21 having upstanding connection boss 22. Central aperture 14 may be either cylindrical or tapered as at 23 in FIG. 2 to accommodate a leur-type fitting relative to connector 13. The lid 21 is snap fitted over container 24. As to the present invention, the particular type of vacuum collection bottle 20 forms no part thereof.

More specifically as to central aperture 14, the same may comprise a cylindrical bore or have one or both internal halves 23 and 23' tapered, as desired. Where a tapered bore as at 23 in FIG. 2 is supplied, then the same not only accommodates a very acceptable fit relative to fitting 22 in FIG. 1 but likewise would provide a wedging for any interior tube 12 contained within the connector 13 such as connector 13A in FIG. 2.

Figure 2:
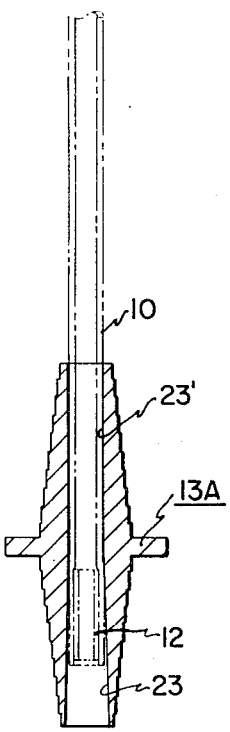
FIG. 2 is a longitudinal, vertical section of a representative connector which is interiorly tapered inwardly.

The operation of the structure of FIGS. 1 and 2 is as follows. As to assembly, the connector 13 is provided together with the integrally supplied dust jacket or protective sleeve 17. Either before or after the insertion of conduit 10 through the connector, the protective sleeve 17 is heat-seamed, for example, to the connector 13 so that an adequate dust jacket facility is supplied the tubular conduit 10. It is preferred that the conduit 10 be inserted completely through the connector and protrude outwardly out of the opposite end thereof for accomplishing the insertion of cylinder 12 which takes the form of a stiffener tube. This accommodates not only easy manipulation of the device but also provides a vacuum-pump connection, as in the case of FIG. 4, and also a wedging action as seen in FIG. 2 so as to prevent the inadvertent withdrawal of conduit 10 from connector 13. Of course, where protective sleeve is resilient and stretched, or otherwise effects a radially inward force against the connector so as to constrict the associated end thereof, then the stiffener tube or cylinder 12 will prevent tubular conduit from pulling out of engagement with connector 13.

FIG. 2 illustrates that the connector 13 such as connector 13A shown in FIG. 2 may be tapered inwardly, if desired, in opposite directions. This is for the purpose of accommodating a reversible nature for the connector, so that one will not have to first be apprised which end is interiorly tapered. Such a feature facilitates ease of assembly since the tubular conduit 10 may be inserted in either direction prior to installation of the stiffener tube 12, if needed or desired.

Figure 3:
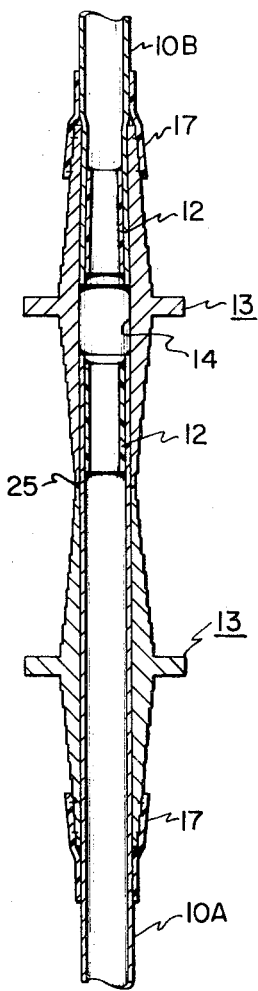
FIG. 3 is a longitudinal, vertical section of a pair of connectors corresponding to the one shown in FIG. 1, for example, wherein the connectors are utilized to couple adjacent plastic tubular lengths together in a convenient manner.

FIG. 3 illustrates a pair of connectors 13 which are employed to join together a pair of tubular conduits 10A and 10B. As in the case of FIG. 1, protective sleeves or dust jacket 17 are supplied as well as the interior rigid stiffener tubes 12.

In operation as to FIG. 3, the tubular conduit 10A is simply urged upwardly through its associated connector 13 until the same protrudes substantially beyond end 25. Correspondingly, tube 10B is withdrawn so as to provide for a space to accommodate the insertion of the uppermost extremity of tubular conduit 10A within the upper connector 13. In accomplishing such a withdrawal of tubular conduit 10B, there is providing a wedging action of stiffener tube 12 so that the tubular conduit 10B will not pull out of the connector. Of course, the interior bore of aperture 14 of the upper connector 13 may be perfectly cylindrical so that tubular conduit 10B can be withdrawn to the position shown in FIG. 3.

Figure 4:
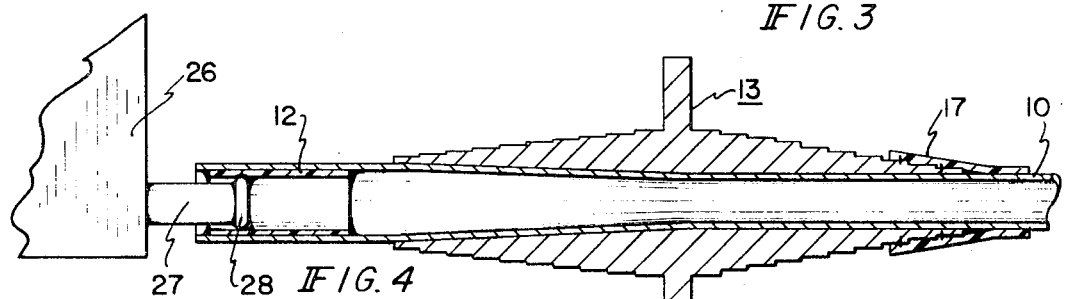
FIG. 4 is a side elevation, principally shown in section, of a vacuum pump, shown in fragmentary view, as being connected to the connector, tubular conduit combination of the invention.

In FIG. 4 there is illustrated use of the connector in connection with a vacuum pump 26. The latter is shown to include an operating vacuum support 27. As to the latter, the same may include an enlarged peripheral bead 28 which is interiorly received in a tight fit engagement relative to the stiffener tube 12.

FIGS. 5A and 5B illustrate that a conduit 10 having standard rubber fitting 29 may be pressed over the outer surface of connector 13 (FIG. 5A) or over the conduit having stiffener tube 12 so as to attain a secure engagement thereat.

It is thus seen that the connector of the present invenfor accommodating conventional end fittings such as the rubber end fittings of FIGS. 5A and 5B, or for providing a satisfactory fit relative to the vacuum pumps.

While particular embodiments of the present invention have been shown and described, it will be obvious to tion supplies a multiplicity of uses as, for example, in connection to a fluid body or other type vacuum bottle, as a means for connecting two lines together, as a device those skilled in the art that changes and modifications may be made without departing from this invention in its broader aspects, and, therefore, the aim in the appended claims is to cover all such changes and modifications as fall within the true spirit and scope of this invention.

I claim:

1. Connector structure including, in combination, an elongate connector having an axially disposed central aperture defining an interior wall, a flexible tubular conduit disposed within said central aperture and being constructed and transversely dimensioned, together with said elongate connector at said aperture, for accommodating the thrusting forwardly of said flexible tubular conduit completely through said elongate connector, such that an extremity thereof extends beyond said elongate connector, and a stiffener tube member disposed within said extremity of flexible tubular member, whereby, when said flexible tubular conduit is pulled rearwardly, said stiffener tube member retains said extremity radially outwardly to frictionally retentively engage said elongate connector interior wall, said stiffener tube member thus being then positioned within said elongate connector, and wherein that end of said elongate connector which is remote from said extremity of said flexible tubular member is provided with a protective sleeve slideably and frictionally engaging said flexible tubular conduit, and wherein said protective sleeve comprises an elastomeric member stretched about said extremity of said elongate connector, whereby to constrict said extremity and thereby preclude the rearward passage of said stiffener tube member through said protective sleeve, said elongate connector being constructed for radial compression and hence constriction at said extremity, and said extremity of said elongate member being thus constricted.

2. In combination, a pair of flexible tubular conduits each having a respective end mutually proximate each other, a pair of elongate connectors having mutually proximate forward extremities and mutually remote rearward extremities, each elongate connector receiving said respective end of a respective one of said conduits in frictional engagement, a pair of stiffener tube members each respectively disposed in a respective one of said flexible tubular conduits proximate said respective ends thereof, a pair of protective sleeves secured to and respectively disposed over the rearward extremities of respective ones of said elongate connectors and frictionally and slideably engaging that respective flexible tubular conduit extending rearwardly through its elongate connector, one of said flexible tubular conduits with its stiffener tubing member being extended forwardly from its elongate connector to be positioned within the remaining elongate connector, whereby said remaining elongate connector interiorly receives both of said flexible tubular conduits in frictional engagement at said proximate forward extremities thereof and both of said stiffener tube members thereat, both of said flexible tubular conduits thereby being positioned at mutually-proximate extremities in said remaining connector.

References Cited

UNITED STATES PATENTS

| 2,584,044 | 1/1952 | Osrow et al. | 285—240 X |
| 2,785,911 | 3/1957 | Kaufman | 285—260 X |
| 2,874,981 | 2/1959 | Brady | 285—238 |

FOREIGN PATENTS

| 721,672 | 1/1955 | Great Britain | 285—238 |
| 1,359,919 | 3/1964 | France | 285—260 |

DAVE W. AROLA, Primary Examiner

U.S. Cl. X.R.

285—175, 240, 260